Sept. 1, 1942.　　　　B. REITER　　　　2,294,763
MACHINE FOR SLIDE FASTENERS
Filed April 19, 1939　　　2 Sheets-Sheet 1
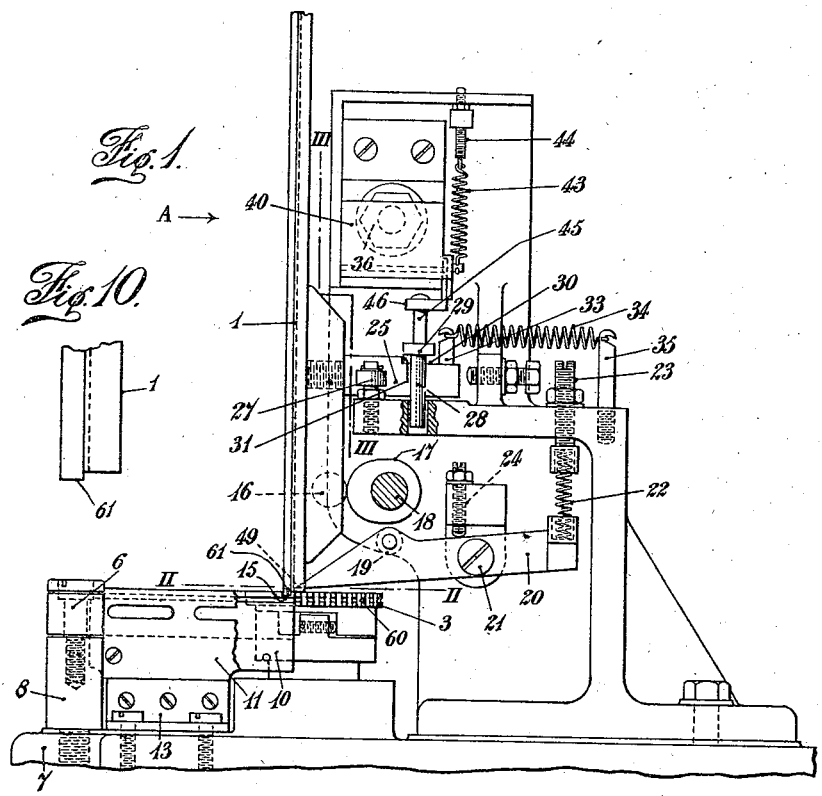
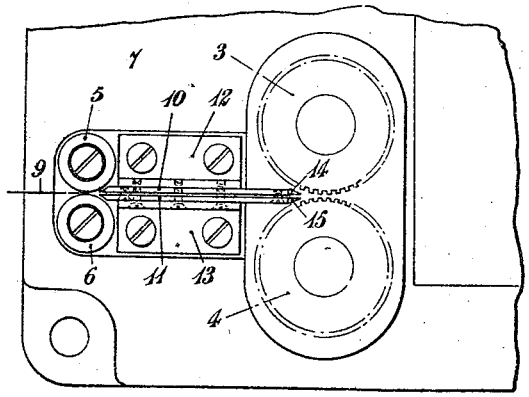
INVENTOR
Bruno Reiter
BY
ATTORNEYS

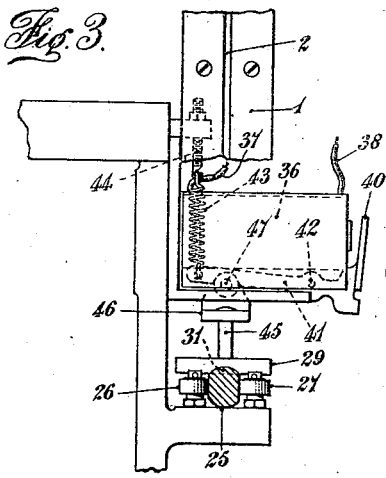

Patented Sept. 1, 1942

2,294,763

UNITED STATES PATENT OFFICE 2,294,763

MACHINE FOR SLIDE FASTENERS

Bruno Reiter, Ruislip, England, assignor to Bell Punch Company Limited, London, England, a British company Application April 19, 1939, Serial No. 268,840
In Great Britain April 28, 1938

11 Claims. (Cl. 153—1)

This invention relates to sliding clasp fasteners of the kind commonly known as "Zip" fasteners. In such fasteners the members which are secured to the carrier and are used to effect fastening are hereinafter referred to as elements. The invention has for its object to provide an improved machine for applying elements of such fasteners to a carrier in a rapid and efficient manner.

According to the present invention a machine for assembling and securing elements of "Zip" fasteners to a carrier consists in means for displacing each element relatively to the carrier and laterally of a pair of wheels or rollers into the converging space therebetween and subjecting the element to head-on pressure whereby it is located at a predetermined height on the carrier at the time it is seized by the rollers, the latter serving in their further rotation to clinch the element on the carrier.

In order that the invention may be clearly understood and readily carried into effect reference is made to the accompanying drawings which show diagrammatically and by way of example apparatus in accordance with the present invention for use in assembling and securing "Zip" fastening elements to a carrier.

Fig. 1 is a side elevation of apparatus in accordance with the present invention.

Fig. 2 is a plan on the line II—II Fig. 1 showing the pressure applying rollers and guiding means for the carrier.

Fig. 3 is a part sectional front elevation on the line III—III Fig. 1 showing electromagnetic means for use in controlling the element feeding means.

Fig. 4 drawn to an enlarged scale is a cross section of the chute.

Figs. 5 and 6 drawn to an enlarged scale are diagrammatic elevation and plan views respectively showing the relative positions of the elements immediately prior to the feeding of an element to the pressure rollers.

Figs. 7 and 8 drawn to an enlarged scale are respectively diagrammatic elevation and plan views showing the relative positions of the elements immediately after the feeding of an element to the pressure rollers and prior to its clinching on the carrier.

Fig. 9 is a view of a part of a carrier showing lengths of applied elements and gaps therebetween.

Fig. 10 is a detail view showing the lower end of the chute.

Referring to the drawings, 1 is a chute having a front slot 2 for guiding the ball on the fastener element and into which a pointed instrument can be inserted to correct jamming if such should occur, the elements 32 being delivered to the upper end of the chute by means which per se form no part of the present invention, and being arranged to move down within the chute under their own weight and with their so-called "legs" lowermost. The chute 1 is mounted to swing about its upper end and is superposed above two toothed wheels or rollers 3, 4 which can be continuously rotated from any suitable primary or auxiliary driving means, the wheels 3, 4 being arranged with the gaps between their teeth opposing one another as illustrated more particularly in Figs. 2, 6 and 8. The wheels 3, 4 may each be made in one piece or they may be made in two or more parts. 5 and 6 are two guide pillars suitably secured to the base 7 of the apparatus or to distance pieces 8 mounted on the base. A beaded carrier 9 in the form of a tape of textile material to which the elements are to be secured is indicated in Fig. 2 and the carrier 9 when the apparatus is in operation passes between guide bars 10, 11 supported by brackets 12, 13 rigidly and adjustably secured to the base of the apparatus. The advance of the carrier is effected by the wheels 3, 4 the latter being formed with grooves 60 for accommodating the bead 51 on the carrier. At their rear ends the guide bars 10, 11 are stepped or recessed as indicated at 14, 15 in Figs. 1 and 2, the two stepped ends 14, 15 being arranged in the space between the rotatable toothed wheels 3, 4.

The chute 1 carries a roller 16 engageable by a cam 17 rigidly mounted on a spindle 18 adapted to be rotated by suitable means from any convenient driving part of the apparatus. When the cam 17 is in rotation it acts on the roller 16 to vibrate the chute to feed the fastener elements on to the carrier 9. The cam 17 can also engage a roller 19 carried by a finger lever 20 pivotally mounted at 21 and constantly under the action of a compression spring 22 the pressure of which can be adjusted by a screw 23, the end 49 of the lever 20 opposite that against which the spring 22 bears being pointed as shown for the purpose hereinafter described. An adjustable stop 24 is provided for limiting movement of the finger lever 20 in a clockwise direction (Fig. 1).

To the rear side of the chute 1 is secured a bar 25, the latter being arranged to pass between guide rollers 26, 27 and being straddled by guide pins 28 carried by a moveable cross bar 29.

The bar 25 is recessed at 30 to form a shoulder 31 which is engageable by the cross bar 29 as hereinafter described to retain the chute 1 in the forward position, i. e. to the left in Fig. 1, and prevent feed of the elements to the carrier. In Fig. 1 the chute although shown in the forward position is not locked in that position and is therefore free to vibrate in order to feed the elements 32 to the supporting bars 10, 11.

The bar 25 is provided with a hook-shaped piece 33 to which is attached one end of a spring 34 the other end of which is secured to an anchor 35 fixed to the frame of the apparatus, the spring 34 serving to return the chute after the latter has been moved in a forward direction by the cam 17 and subsequently released thereby. The pointed end 49 of the lever 20 extends into the chute through a slot in the lower rear side of the latter and can project between the lowermost element in the chute and the element immediately above it, the lever 20 being then in a position to apply head-on pressure to the lowermost element.

The construction and arrangement of parts as hereinbefore described permits of the continuous application of fastener elements to any desired length of carrier. Zip fasteners however are generally sold in the open market in lengths of for example 4″, 6″, 8″, 12″ and more and by the present apparatus a carrier can be produced having any number of lengths of applied elements with gaps therebetween. A gap on the carrier is produced by arresting the chute 1 and this arrest is effected by moving the cross piece 29 downwardly to engage behind the shoulder 31. Movement of the cross piece 29 is controlled by an electromagnet 36 to which current is supplied by leads 37, 38. When the electromagnet is energised its armature 40 is attracted to move a lever 41, the latter being pivoted at 42 and having attached to its other end a spring 43 the tension of which is adjustable by the screwed anchor 44. The cross piece 29 is fixed to a pin 45 carried by a bracket 46 which is pivotally secured to the lever 41 and hence when the armature 40 is attracted the crosspiece is caused to move downwardly. The supply of current to the electromagnet may be controlled manually by a hand-operated switch or automatically.

The operation of the apparatus above described is as follows:

Assume the chute is in its forward position illustrated in Fig. 1. In this position the lowermost element rests on the stepped ends 14, 15 of the supports 10, 11 (see element 48 Figs. 5 and 6) and the pointed end 49 of the lever 20 is outside the guideway in the chute down which the elements move. When the cam 17 rotates to permit the chute to be swung by the spring 34 in a rearward direction the lowermost element moves along the ends 14, 15 and simultaneously the point 49 projects by movement of the chute between the lowermost element and those above it to support the said remaining elements during application of the lowermost element to the carrier. Subsequently the lowermost element drops off the ends 14, 15 on to the bead 51 of the carrier, the upper end of the element remaining in the chute after the element has so dropped, and immediately afterwards it is subjected to head-on pressure by the lever 20 which serves to position it correctly on the bead. It is then carried by the carrier into the space between a pair of opposed gaps in the rollers 3, 4 (see element 48, Figs. 7 and 8), the lever 20 remaining in engagement with the head of the element until it has been seized by the rollers and has had its legs 51, 52 clinched around the bead on the carrier. The depending lip 61 of the chute prevents the element from toppling over during its introduction to the carrier.

As soon as the element is picked up by the rollers the chute is moved in a forward direction, the elements in the chute being supported on the point 49 of the lever 20 until such time as the lower end of the chute moves over the ends 14, 15 whereupon the point 49 withdraws from the guideway in the chute and permits the next lowermost element to move down on to the said ends. By this time the chute has reached its forward position and a cycle of operations has been completed. By constantly repeating the cycle a continuous and unbroken series of elements will be applied to the carrier and this series will increase in length until such time as the feed of elements to the carrier is arrested.

When it is desired to produce a carrier having lengths of applied elements and gaps therebetween as shown in Fig. 9 current is supplied to the electromagnet 36 at the appropriate instants for the required durations. During the interval represented between 54 and 55 the elements 32 are continuously applied to the carrier 9. At the point 55 the electromagnet is energised to move the cross piece 29 into position behind the shoulder 31, this action serving to maintain the chute in the forward position wherein the elements cannot drop off the ends 14, 15 and the feed of elements to the carrier is prevented although the latter continues to be advanced by the wheels 3, 4. A length of carrier will thus pass through the wheels without having elements applied thereto and the gap 55—56 will be created. At the point 56 the electromagnet is deenergised whereupon the spring 43 withdraws the cross piece 29 from the shoulder 31 and consequently the chute is permitted to restart delivery of elements. This will continue until the point 57 is reached when the electromagnet is again energised to produce another gap as at 57, 58. These cyclical operations can be repeated as long as required on any desired length of carrier by suitable energising of the electromagnet and by varying the duration of the current thereto and the intervals between successive energisings the length of the gap and of the series of applied elements can be varied at will.

It will be readily understood from the above description that the use of relatively small wheels such as 3, 4 not only ensures a rapidly widening gap for the reception of the fastening elements but also efirct economy in construction and enables operation at high speed.

The invention is not limited to the example described as subordinate details of construction may be varied to meet different requirements. For example instead of providing the ends 14, 15 on which to support the elements when the chute is in the forward position, the lowermost element may rest directly on the bead 51 of the carrier in this position of the chute and prior to its being forced over the bead by the lever 20.

Also instead of employing toothed rollers or wheels for clinching the elements on the carrier a pair of plain rollers may be used, the chute and lever 20 being arranged as before to release the element immediately it has been seized by the rollers. Additionally, instead of vibrating the entire chute, a portion only at its lower end may be vibrated.

By specifying the element as being displaced "laterally" of the rollers and into the converging space therebetween in the following claims is meant that it is moved towards the space between the rollers in a direction in which the said space decreases in width.

I claim:

1. Apparatus for securing elements of "Zip" fasteners to a carrier comprising guide means for said elements arranged to deliver them to the carrier, means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, the control of delivery by said controlling means in conjunction with the carrier movement effecting spaced location of the elements on said carrier for presentation to the clinching means.

2. Apparatus for securing elements of "Zip" fasteners to a carrier comprising guide means for said elements arranged to deliver them to the carrier, cooperating rotary means adjacent to said guide means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, the control of delivery by said controlling means in conjunction with the carrier movement effecting spaced location of the elements on said carrier for presentation to the clinching means.

3. Apparatus for securing elements of "Zip" fasteners to a carrier comprising guide means for said elements arranged to deliver them to the carrier, means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, and means for subjecting each element to head-on pressure to move it lengthwise of said guide means to locate it at a predetermined height on said carrier, the control of delivery by said controlling means in conjunction with the carrier movement effecting spaced location of the elements on said carrier for presentation to the clinching means.

4. Apparatus for securing elements of "Zip" fasteners to a carrier comprising guide means for said elements arranged to deliver them to the carrier, means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, the control of delivery by said controlling means in conjunction with the carrier movement effecting spaced location of the elements on said carrier for presentation to the clinching means, and means for interrupting feed of elements to the carrier while movement of the carrier continues thereby to provide a portion of the carrier which is free from elements.

5. Apparatus for securing elements of "Zip" fasteners to a carrier comprising guide means for said elements arranged to deliver them to the carrier, means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, the control of delivery by said controlling means in conjunction with the carrier movement effecting spaced location of the elements on said carrier for presentation to the clinching means, and means for interrupting feed of elements to the carrier while movement of the carrier continues thereby to provide a portion of the carrier which is free from elements, said interruption being effected by prevention of vibration of said element guide means.

6. Apparatus for securing elements of "Zip" fasteners to a carrier comprising guide means for said elements arranged to deliver them to the carrier, means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier, the delivery end of said element guide means adjacent to the carrier, said holding means being ineffective when the guide means moves to a predetermined extent in the direction of movement of the carrier, and a pivoted lever for subjecting each element to head-on pressure to move it lengthwise of said guide means to locate it at a predetermined height on said carrier, the control of delivery by said controlling means in conjunction with the carrier movement effecting spaced location of the elements on said carrier for presentation to the clinching means.

7. Apparatus for securing elements of "Zip" fasteners to a carrier comprising guide means for said elements arranged to deliver them to the carrier, continuously rotating means adjacent to said guide means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, the control of delivery by said controlling means in conjunction with the carrier movement effecting spaced location of the elements on said carrier for presentation to the clinching means.

8. Apparatus for securing elements of "Zip" fasteners to a carrier comprising guide means for said elements arranged to deliver them to the carrier, toothed rotary means adjacent to said guide means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, the control of delivery by said controlling means in conjunction with the carrier movement effecting spaced location of the elements on said carrier for presentation to the spaces between the teeth of said clinching means.

9. Apparatus for securing elements of "Zip" fasteners to a carrier comprising guide means for said elements arranged to deliver them to the carrier, means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, said element guide means being shaped to advance the lowermost element when moving in one direction but to release it when moving in the opposite direction, and said controlling means including means retaining the next higher element in said element guide means during the location of the lowermost element on the carrier, the control of delivery by said controlling means in conjunction with the carrier movement effecting spaced location of the elements on said carrier for presentation to the clinching means.

10. Apparatus for securing elements of "Zip" fasteners to a carrier comprising guide means for said elements arranged to deliver them to the carrier, means for clinching said elements on said carrier, means for guiding said carrier past the clinching means, and means for controlling delivery of elements from said guide means including means for holding the fastener elements in the guide means, and means for vibrating through a substantial extent of movement in the direction of, and opposite, movement of said carrier the delivery end of said element guide means adjacent to the carrier, said holding means being ineffective when the guide means moves to a predetermined extent in the direction of movement of the carrier, the last named means comprising a cam for moving said element guide means in one direction and a spring for moving it in the opposite direction, the control of delivery by said controlling means in conjunction with the carrier movement effecting spaced location of the elements on said carrier for presentation to the clinching means.

11. Apparatus for securing elements of "Zip" fasteners to a carrier comprising guide means for said elements, a stationary support on which said guide means delivers said elements, means for clinching said elements on said carrier, means for guiding said carrier past the support and said clinching means, and means for effecting movements of said element guide means in the direction of movement of the carrier to cause displacement of elements engaged by the guide means from said support onto said carrier.

BRUNO REITER.